United States Patent [19]

Babb

[11] 3,718,207
[45] Feb. 27, 1973

[54] METHOD AND APPARATUS FOR PROVIDING UNDERWATER SEISMIC ENERGY SIGNALS

[75] Inventor: John J. Babb, Jackson, Miss.

[73] Assignee: Delta Exploration Company, Inc., Jackson, Miss.

[22] Filed: Dec. 10, 1969

[21] Appl. No.: 883,809

[52] U.S. Cl. ................. 181/.5 H, 181/.5 JM, 340/7, 340/12, 116/137
[51] Int. Cl. .............................................. G01v 1/38
[58] Field of Search ......... 181/.5 H, .5 JM; 340/12, 7; 116/27, 137

[56] References Cited

UNITED STATES PATENTS

| | | | |
|---|---|---|---|
| 2,792,804 | 5/1957 | Bouyoucos et al. | 116/137 |
| 3,610,366 | 10/1971 | Goldberg | 181/.5 H |
| 3,642,090 | 2/1972 | Bennett | 181/.5 H |
| 3,642,089 | 2/1972 | Parker et al. | 181/.5 H |
| 2,395,862 | 3/1946 | Freeman et al. | 340/12 |
| 3,536,157 | 10/1970 | Anstey | 181/.5 |

Primary Examiner—Benjamin A. Borchelt
Assistant Examiner—N. Moskowitz
Attorney—Pravel, Wilson & Matthews

[57] ABSTRACT

A seismic energy source provided in the form of a hollow cylindrical member supporting a drum plate on its rear end and connected to a tow line on its forward end for movement through a body of water with rapid-actuating valve means on the rear of the cylindrical member which, when closed, entraps a large mass of water the inertia of which resists continued movement of the cylindrical member; a piston and cylinder assembly is connected to the tow line by a piston rod so that the momentum of the towing vessel moves the piston with respect to the cylinder to pressurize a pressure accumulator to a desired pressure at which point a release coupling between the rod and the tow line is activated to permit the rod to be forcefully urged at a high speed rearwardly to strike the drum plate to provide a seismic signal.

12 Claims, 5 Drawing Figures

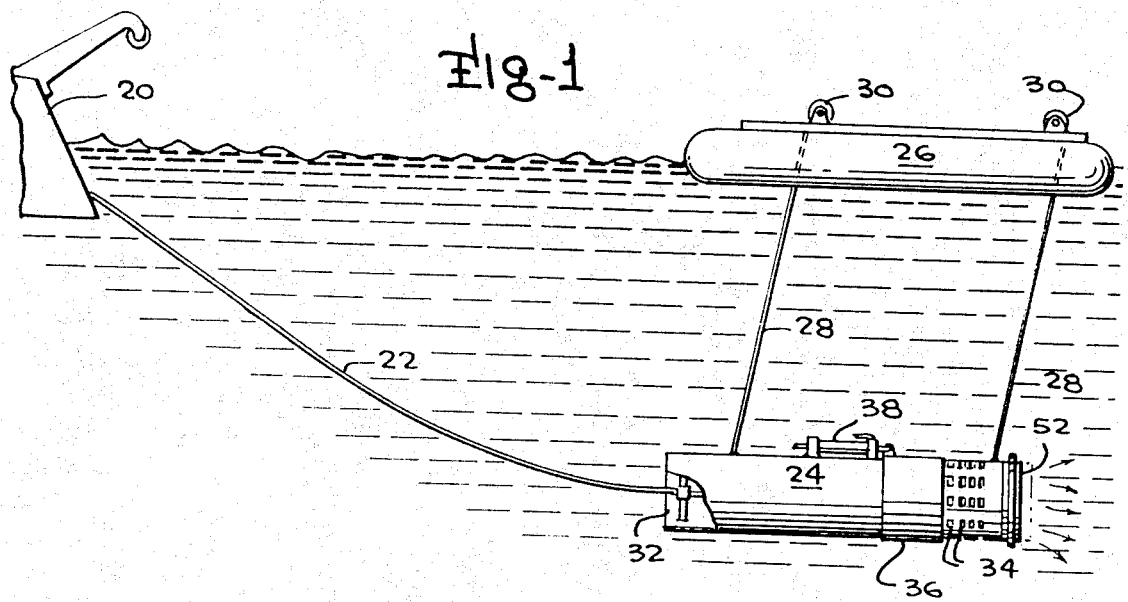
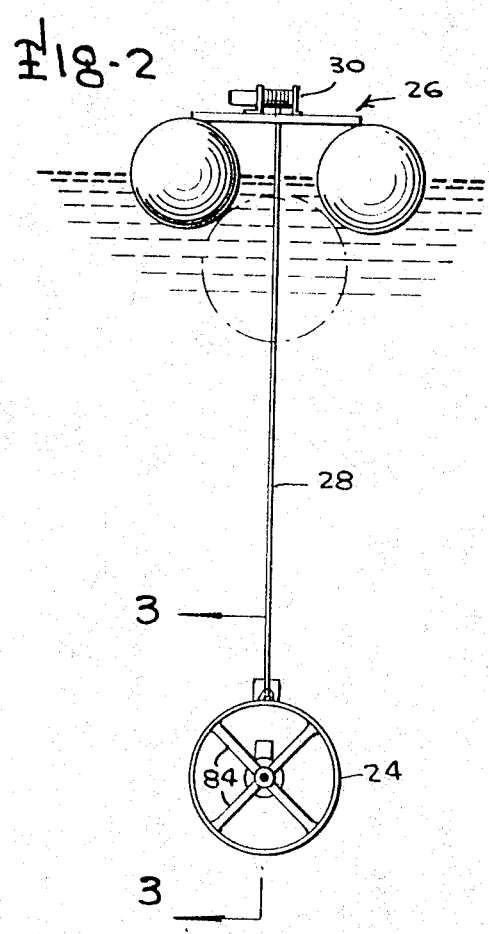
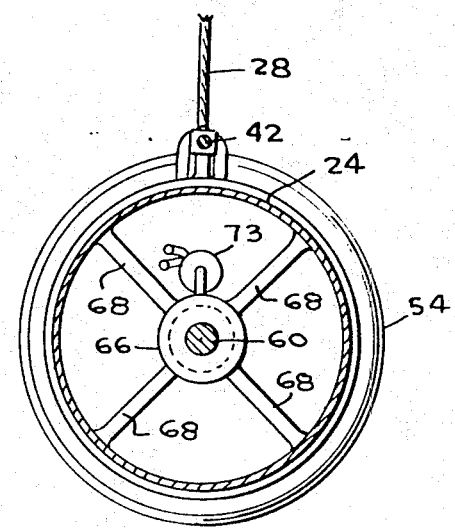
Fig-1
Fig-2
Fig-5
INVENTOR
JOHN J. BABB
BY
Mason, Fenwick & Lawrence
ATTORNEYS

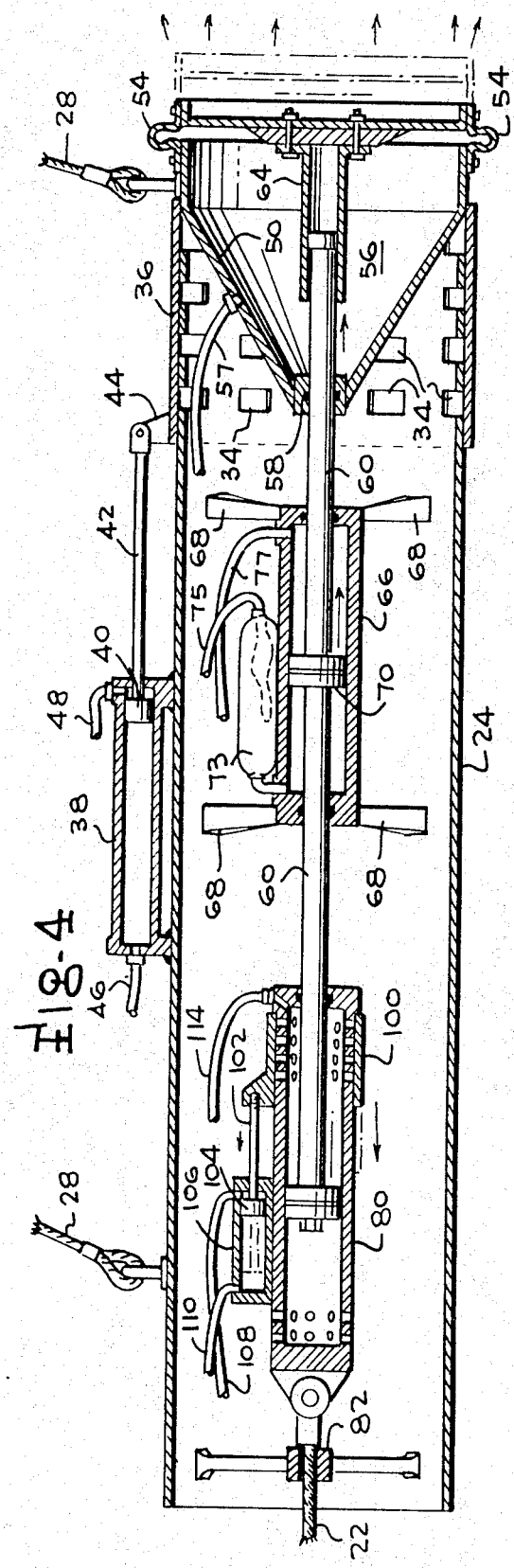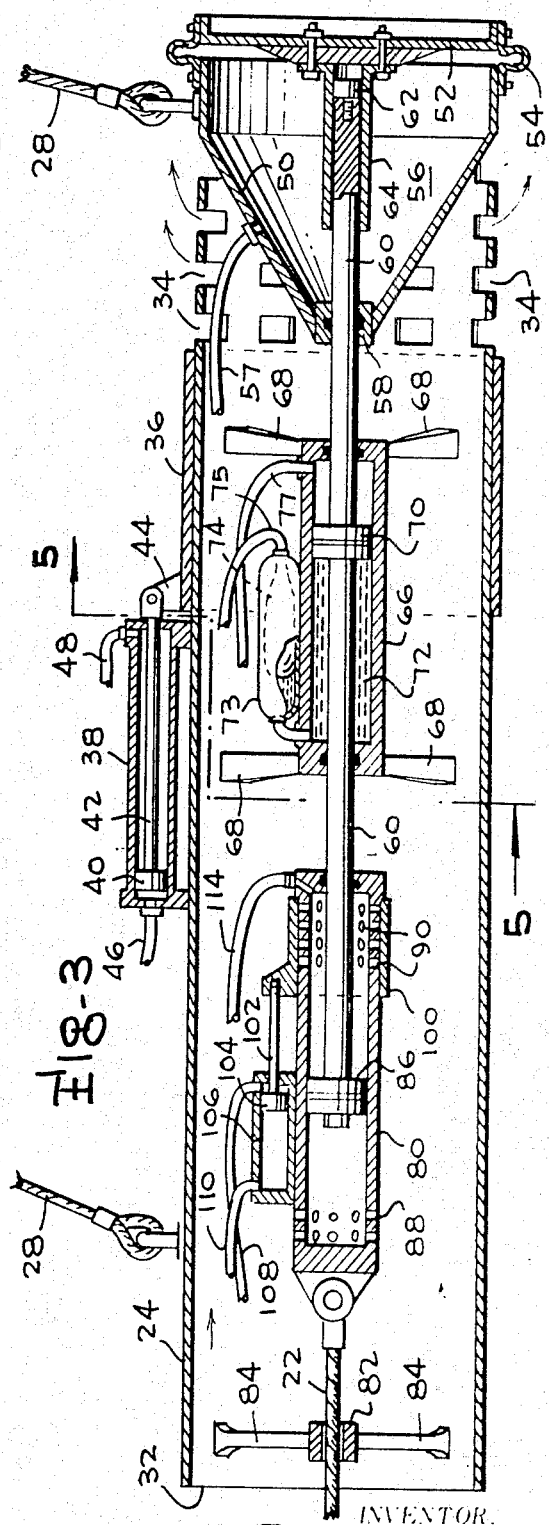

METHOD AND APPARATUS FOR PROVIDING UNDERWATER SEISMIC ENERGY SIGNALS

BACKGROUND OF THE INVENTION

This invention is broadly directed to the field of signal providing devices and is specifically directed to mechanical means for providing a seismic signal in under-water seismic exploration.

Seismic exploration has previously been largely conducted by the employment of explosive means which are detonated underwater to provide seismic signals. However, the use of explosive means is undesirable for a number of reasons and the need for a substitute signal source has long been recognized by those skilled in the art. Consequently, a variety of non-explosive seismic signal source providing means has evolved in response to the recognized need for an explosive substitute for providing seismic signals.

Any seismic energy source should provide a high strength signal which will provide reflected signals of a substantially high energy level as to avoid the necessity for employing highly sensitive sensors and control equipment. Moreover, it is obviously desirable that any seismic energy source be economical to construct, maintain and operate. Unfortunately, the prior known non-explosive devices have failed to provide seismic signals of adequate strength and have also, in many instances, been overly complex and consequently expensive to operate and maintain. The instant invention, on the other hand, provides a rugged and relatively simple device which is economical to operate and maintain and which provides a uniquely high signal level.

SUMMARY OF THE INVENTION

It is the primary object of this invention to provide a new and improved non-explosive seismic signal source.

In the present invention a towed body in the form of a main body in the form of an elongated hollow main cylindrical member has a drum plate of substantial dimensions mounted adjacent its rearmost end and supporting a hammer rod for reciprocation coaxially along its interior. The hammer rod has a piston on its forward end which is received within a releasable drive connector in the form of a towing cylinder which is connected on its forward end to a tow line extending from a towing vessel. The towing cylinder is provided with a selectively operable valve means on its rearmost end which, when closed, serves to entrap water on the interior of the cylinder so that the force exerted by the tow line on the cylinder is conveyed through the entrapped water to the piston on the forward end of the rod so that the entire device is towed by the towing vessel.

The front end of the elongated hollow cylindrical member comprising the main body is substantially open and the rear end of the cylindrical member is provided with a large number of discharge apertures so that water can enter the front end of the cylindrical member and pass through the cylindrical member to exit via the openings adjacent the rearmost end thereof. However, rapid-acting valve means are provided adjacent the rearmost end of the cylindrical member for quickly obstructing the discharge openings to entrap a large mass of water on the interior of the cylindrical member as it is being towed by a surface vessel. Entrapment of this large mass of water creates a very large force tending to stop forward movement of the cylindrical member due to the high inertia of the entrapped water. However, the towing vessel has a large momentum and continues to move forwardly and exerts a substantial force on the hammer rod by virtue of the connection between the tow line and the releasable drive connector which is in the form of a towing cylinder connected to the piston on the forward end of the hammer rod. A drive piston adjacent the rearmost end of the hammer rod is received within the confines of a drive cylinder which is fixedly attached to the main hollow cylindrical member. Consequently, the forward movement of the ship, when coupled with the resistance to forward movement created by the high inertia of the relatively stationary entrapped water in the cylindrical member, serves to move the hammer rod forwardly so that the power piston forces oil from the power cylinder into a pressure accumulator attached to the power cylinder. Consequently, pressure within the accumulator rises rapidly to a desired high level. Upon pressure in the accumulator reaching the desired level, the releasable drive connector between the tow line and the forward end of the rod is actuated to release the rod to permit the rod to be hurled rearwardly by the pressure in the accumulator acting upon the power piston. Consequently, the rearmost end of the hammer rod strikes the drum plate to provide a high level seismic signal. Release of the drive connection between the towing cylinder and the hammer rod is enabled by opening of the selectively operable valve means on the rearmost end of the towing cylinder which permits water on the interior of the cylinder to escape so that the rod can move rearwardly. However, following the generation of a seismic signal, it is desirable to return the hammer rod to its forward position in order that the process may again be repeated. A control line from the towing vessel provides water pressure for moving the rods forwardly subsequent to closure of the selectively operable valve means on the towing cylinder. Additionally, a hydraulic control signal is provided for opening the quick-acting valve means on the rear end of the main hollow cylindrical member so that the apparatus can assume its initial condition and repeat the cycle of operation.

DESCRIPTION OF THE DRAWINGS

FIG. 1 is a perspective view illustrating the manner of operation of the preferred embodiments for practice of this invention;

FIG. 2 is a front elevational view of the preferred embodiment;

FIG. 3 is a sectional view taken along lines 3—3 of FIG. 2;

FIG. 4 is a sectional view similar to FIG. 3 but illustrating the parts in a different operative position; and FIG. 5 is a sectional view taken along lines 5—5 of FIG. 3.

DESCRIPTION OF THE PREFERRED EMBODIMENT

The preferred embodiment for practice of this invention is illustrated in FIG. 1 in which the three main components employed in practice of the invention are shown. These components comprise a towing vessel 20 which is connected by a tow line 22 to a submerged hollow main body 24 of elongated cylindrical configuration. A twin-hulled support float 26 is connected to the hollow main body 24 by support lines 28 which can be adjusted by conventional winch means 30 on the support float to adjust the depth of operation of the hollow main body 24 in an obvious manner.

Turning now to FIG. 3, it should be noted that the hollow main cylindrical body member 24 is provided with an inlet opening 32 on its forwardmost end in order that environmental water may enter the interior of the cylindrical member 24 as the device is being towed by the towing vessel 20 and tow line 22. Additionally, a plurality of discharge openings 34 are provided adjacent the rearmost end of the cylindrical member 24. Consequently, water can flow inwardly into the interior of the main cylindrical member 24 to pass through the main cylindrical member to exit via the openings 34. However, quick-acting valve means in the form of an encircling valve sleeve 36 encircling the periphery of cylindrical member 24 is provided for movement between an open position illustrated in FIG. 3 in which water is free to flow through the cylindrical member 24 and a closed position illustrated in FIG. 4 in which the discharge openings 34 are blocked so as to prevent flow of water through member 24. Valve sleeve 36 is movable between the two positions illustrated in FIGS. 3 and 4 by means of a valve actuator cylinder 38 attached to the exterior of the hollow main body 24 in a central position thereof as shown in the drawings. Cylinder 38 has a piston 40 on its interior with a piston rod 42 extending from the piston for connection to a bracket 44 on the forward end of the valve sleeve 36. Control lines 46 and 48 respectively serve to provide pressure for closing and opening the valve sleeve 36 in an obvious manner.

A conical bell member 50 extends inwardly on the interior of the hollow main body 24 immediately rearward of the openings 34 as best shown in FIG. 3 and a drum plate 52 connected to the rearmost edge of the main body member 24 cooperates with the conical bell member 50 to define an air chamber 56. The apex of the conical bell member 50 is provided with an aperture in the form of an annular seal member 58 through which a hammer rod 60 extends. Pressure in air chamber 56 is adjustable by means of a control line 57. A replaceable striking head 62 is threaded into the rearmost end of the hammer rod 60 as shown in FIG. 3 and the rearmost end of the hammer rod is slidably received within a guide sleeve 64 extending forwardly from the drum plate 52. As will be more evident, the hammer rod 60 and the striking head 62 are capable of reciprocal movement with respect to the drum plate 52.

Hammer rod 60 is supported for reciprocation coaxially within the hollow main body 24 and extends through a power cylinder 66 fixedly attached to the hollow main body 24 by means of radially extending brace members 68 which provide a fixed connection between cylinder 66 and the main body 24.

A power piston 70 is fixed to hammer rod 60 for reciprocation within the power cylinder 66 and a quantity of hydraulic fluid or oil 72 is provided forwardly of piston 70 as shown in FIG. 3. A pressure accumulator means 73 is attached to the exterior of power cylinder 66 and communicates with the forward end of the interior of the cylinder so that relative movement of the power piston 70 to the left is viewed in FIG. 3 forces fluid 72 from within the cylinder into the pressure accumulator. The pressure accumulator is of conventional design and includes a flexible closed member 74 inflated with air or other gas from a pressure adjusting line 75 which is then closed by valve means (not shown) connected to line 75. Movement of piston 70 to the left causes the fluid 72 to increase the pressure on the gas within member 74 in an obvious manner. Additionally, it should be noted that the pressure on fluid 72 created by the pressure accumulator serves to exert a force on piston 70 which would move rod 60 to the right or rearwardly as viewed in FIG. 3 if other forces were not acting upon hammer rod 60. An additional pressure line 77 is connected to cylinder 66 for a purpose to be discussed hereinafter.

Movement is imparted to the main body member 24 from the tow line 22 by virtue of a releasable connector means in the form of a towing cylinder 80 connected on its forward end to line 22 which extends into the interior of member 24 through a tow line guide 82 supported coaxially within body 24 by radial support braces 84. Towing cylinder 80 receives a towing piston 86 fixed on the forward end of the hammer rod 60. The forward end of the towing cylinder 80 is provided with a plurality of apertures 88 and the rear end of the towing cylinder 80 is similarly provided with a plurality of apertures 90. A quick-acting valve in the form of a reciprocable valve sleeve 100 connected by a piston rod 102 to a piston 104 in an actuator cylinder 106 serves to open and close the openings 90 in a manner analagous to the manner in which the valve sleeve 36 opens and closes openings 34. Input signal lines 108 and 110 receive pressurized fluid for actuating pistons 104 to respectively open and close the openings 90. Additionally, a hydraulic pressure line 114 is connected to the rearmost end of the towing cylinder 80 and serves to inject pressurized water into cylinder 80 to move the towing piston 86 to the left with respect to cylinder 80 when valve sleeve 100 is closed. The purpose of this movement will be discussed hereinafter. However, it should be noted that openings 88 permit water to the left of piston 86 to be forced outwardly from the interior of cylinder 80 when the piston 86 is moved leftward in the aforementioned manner. Similarly, it should be noted that opening of the valve sleeve 100 will enable the piston 86 to move to the right to force the water on the right of the piston outwardly through the openings 90 in an obvious manner.

A complete cycle of operation of the preferred embodiment will now be discussed with initial reference being made to FIG. 3 of the drawings which illustrates the position of the respective parts during a towing operation of the device. It should be understood that the respective parts are positioned by virtue of control pressure signals received to the various lines 46, 48, 57, 75, 77, 108, 110 and 114 which extend upwardly to the towing vessel along the tow line 22. However, the extension of these various lines has not been illustrated since such would merely serve to clutter the drawings.

Tow line 22 serves to tow the hollow main body 24 forwardly (to the left as viewed in FIG. 3) with environmental water entering the inlet opening 32 and passing through the interior of the main body 24 to exit via the discharge apertures 34 as shown by the flow arrows in FIG. 3. It should be noted that valve sleeve 100 is closed and a quantity of water is trapped to the right of towing piston 86 on the interior of the towing cylinder 80 so that the towing force from the tow line 22 is conveyed through towing cylinder 80 to towing piston 86 by virtue of the incompressibility of water to the right of the piston 86. Additionally, it should be noted that the power piston 70 is in the position illustrated in FIG. 3 and the pressure in accumulator 73 is at a relatively low level as evidenced by the enlarged dimensions of the flexible member 74.

When it is desired to create a seismic signal, the operator on the towing vessel actuates control means for providing pressurized hydraulic fluid through line 46 to the control cylinder 38. Consequently, valve sleeve 36 is rapidly moved from the open position illustrated in FIG. 3 to the closed position illustrated in FIG. 4 so as to completely block discharge openings 34. Closure of discharge openings 34 immediately entraps a mass of water on the interior of the hollow main body 24. Since this mass of water is relatively stationary with respect to the main body member 24, the inertia of the mass of entrapped water immediately exerts a substantial inertia force against further forward movement of the hollow main body 24. However, tow line 22 exerts a substantial pull on the towing cylinder 80 and rod 60 by virtue of the momentum of the towing vessel plus the drive force from the propelling system of the towing vessel so that rod 60 tends to be shifted to the left from the position illustrated in FIG. 3 to the position illustrated in FIG. 4. It should be kept in mind that the inertia of the relatively stationary water entrapped within the interior of member 24 acts to retard shifting movement of member 24 and power cylinder 66 connected thereto.

Movement of piston 70 to the left from its FIG. 3 position to its FIG. 4 position forces the fluid 72 on the left portion of the power cylinder 66 into the pressure accumulator 73 to compress the gas within the flexible member 74. A substantial amount of work is done in compressing the gas within member 74 and this work is obviously accomplished by virtue of a reduction on the momentum of the towing vessel. Consequently, pressure accumulator 73 serves to store the energy represented by the reduction in momentum of the towing vessel. However, upon the pressure in the accumulator 73 reaching a desired high level, a hydraulic signal is applied to the actuator cylinder 106 by line 108 for shifting piston 104 to the left in the direction of the arrows in FIG. 4 to unblock apertures 90. The opening of apertures 90 permits the water to the right of piston 86 to escape through opening 90 and also means that the only substantial force exerted on the hammer rod 60 is the very large force from pressure accumulator 73 exerted by fluid 72 against power piston 70. Therefore, hammer rod 60 is moved to the right at a very high velocity from the position illustrated in FIG. 4 so that the striking head 62 hits the drum plate 52 at a very high velocity to create a high level seismic signal.

The preferred embodiment is returned to its original FIG. 3 condition in order to repeat the cycle by initially supplying pressurized fluid through line 48 to open sleeve valve 36. Fluid is then applied through line 77 to shift piston 70 to the left to the FIG. 3 position and pressure is also supplied to line 110 for closing the valve sleeve 100. Pressure is subsequently supplied through line 114 following closing of the valve sleeve 100 to shift the cylinder 80 to the right with respect to pulling piston 86 and hammer rod 60 so that the parts then assume the relative positions illustrated in FIG. 3. The parts are then in a position to repeat the cycle of operation.

The foregoing disclosure and description of the invention are illustrative and explanatory thereof, and various changes in the size, shape, and materials as well as in the details of the illustrated construction may be made without departing from the spirit of the invention.

I claim:

1. A device for providing underwater seismic signals as the device is towed beneath the surface of a body of water by a towing means extending from a towing vessel, said device comprising:
   a. selectively operable means for applying a force against said towing means in a direction opposite the direction of movement of the towing vessel to reduce the momentum of the towing vessel;
   b. energy absorbing means for storing energy lost by the towing vessel through reduction of its momentum; and
   c. energy converting means for converting said stored energy into underwater seismic signals.

2. The structure of claim 1, wherein:
   a. said towing means comprises a tow line; and
   b. said selectively operable means includes water entrapping means for entrapping water wherein the entrapped water provides resistance to movement of the towing vessel to reduce the momentum of the towing vessel.

3. The structure of claim 2 wherein said energy absorbing means comprises:
   a. a power cylinder mounted with said water entrapping means;
   b. a pressure accumulator connected to said power cylinder;
   c. a piston and a piston rod in said power cylinder; and
   d. releasable drive means for connecting said piston rod to said tow line wherein resistance to movement by said water entrapping means causes the towing vessel to move said piston with respect to said cylinder to increase the pressure in said pressure accumulator and reduce the momentum of the towing vessel.

4. The structure of claim 3 wherein said energy converting means comprises:
   a drum plate for engaging said piston rod upon release of said releasable drive means from said piston rod, said piston rod exerting a striking force formed by the pressure in said pressure accumulator driving said piston rod to strike said drum plate.

5. A method for providing a seismic signal comprising the steps of towing a hollow member through a body of water so that water enters said hollow member and flows through said hollow member to exit therefrom, rapidly entrapping the body of water within said hollow member to provide an inertia force resisting continued movement of said hollow member, using the inertia force of said entrapped water and the momentum of a towing vessel acting in opposite directions for increasing the pressure in a pressure accumulator to a high level and driving a piston by the high level pressure in said accumulator to accelerate a striking head to strike a drum plate to provide a seismic signal.

6. An underwater seismic signal source for forming a seismic signal when towed in a body of water by a towing vessel, comprising:
  a. body member means for permitting the water to flow therethrough when towed by the towing vessel;
  b. selectively operable means for blocking the flow of water in said body member means, exerting a force reducing the momentum of the towing vessel;
  c. accumulator means for storing energy from the reduction of momentum of the towing vessel; and
  d. means for converting said stored energy into a seismic signal.

7. The structure of claim 6, further including:
  a. power cylinder means for containing a fluid therein; and
  b. power piston means operably connected with the towing vessel for exerting force on the fluid in said power cylinder means when the flow of water in said body member means is blocked.

8. The structure of claim 7, wherein said accumulator means comprises:
  pressure responsive means for absorbing the force from the fluid in said power cylinder means.

9. The structure of claim 6, wherein said means for converting comprises:
  a. drum plate means for forming a seismic signal when struck; and
  b. hammer rod means responsive to said accumulator means for striking said drum plate means.

10. The structure of claim 6, further including releasable connector means comprising:
  a. means for transmitting a force from the towing vessel to said accumulator means; and
  b. actuator means for permitting the energy stored in said accumulator means to act on said means for converting.

11. An apparatus for forming a seismic signal, comprising:
  a. body member means for permitting the flow of water therethrough;
  b. means for entrapping a body of water in said body member means to provide a force resisting movement of said body member means;
  c. means for accumulating energy from the force resisting movement of said body member means;
  d. striker means responsive to said means for accumulating energy for forming the seismic signal; and
  e. actuator means for permitting the energy in said means for accumulating to operate said striker means.

12. A method of forming a seismic signal comprising the steps of:
  a. towing a member through a body of water so that the water flows through the member;
  b. entrapping a body of water in the member to exert a force resisting movement of the member;
  c. opposing the force exerted by said step of entrapping with the force exerted by said step of towing to thereby form a pressure;
  d. accumulating the pressure formed by said step of opposing; and
  e. striking a portion of the member using the pressure accumulated to form a seismic signal.

* * * * *